United States Patent
Solovyeva et al.

(10) Patent No.: US 11,795,361 B2
(45) Date of Patent: Oct. 24, 2023

(54) FLUORESCENT ASSEMBLIES FOR DRILLING DEPTH CORRELATION

(71) Applicant: SAUDI ARABIAN OIL COMPANY, Dhahran (SA)

(72) Inventors: Vera Solovyeva, Moscow (RU); Nouf Jabri, Dhahran (SA); Alberto Marsala, Venice (IT); Klemens Katterbauer, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/643,195

(22) Filed: Dec. 8, 2021

(65) Prior Publication Data

US 2023/0174839 A1 Jun. 8, 2023

(51) Int. Cl.
| | |
|---|---|
| C09K 8/035 | (2006.01) |
| E21B 47/11 | (2012.01) |
| C09K 8/03 | (2006.01) |
| C09K 11/06 | (2006.01) |

(52) U.S. Cl.
CPC .............. *C09K 8/035* (2013.01); *C09K 8/032* (2013.01); *C09K 11/06* (2013.01); *E21B 47/11* (2020.05); *C09K 2208/08* (2013.01)

(58) Field of Classification Search
None
See application file for complete search history.

(56) References Cited

U.S. PATENT DOCUMENTS

| | | |
|---|---|---|
| 4,053,433 A | 10/1977 | Lee |
| 4,131,064 A | 12/1978 | Ryan et al. |
| 7,645,596 B2 | 1/2010 | Williams et al. |
| 8,627,902 B2 | 1/2014 | Hammer et al. |
| 10,808,529 B2 | 10/2020 | Ow et al. |

(Continued)

FOREIGN PATENT DOCUMENTS

| | | |
|---|---|---|
| CN | 110249021 B | 9/2021 |
| WO | 1994009372 A1 | 4/1994 |
| WO | 2022087037 A1 | 4/2022 |

OTHER PUBLICATIONS

Avens, Heather J., et al., "Fluorescent polymeric nanocomposite films generated by surface-mediated photoinitiation of polymerization", J. Nanopart Res, pp. 331-346, 2011 (16 pages).

Hansen, Ryan R., et al., "Quantitative evaluation of oligonucleotide surface concentrations using polymerization-based amplification", Anal Bioanal Chem, pp. 167-175, 2008 (9 pages).

(Continued)

*Primary Examiner* — Andrew Sue-Ako

(57) ABSTRACT

A composition of matter including a fluorescent assembly and a drilling fluid is provided. The fluorescent assembly includes a matrix material and a plurality of fluorophores held within the matrix material and has an average particle size of at least one millimeter. A method includes introducing the fluorescent assembly into a drilling fluid and circulating the drilling fluid through a well during a drilling operation that creates formation cuttings such that the fluorescent assembly interacts with the formation cuttings, creating tagged cuttings. The method further includes collecting returned cuttings from the circulating drilling fluid at a surface of the well, detecting the presence of the fluorescent assembly on the returned cuttings to identify the tagged cuttings, and correlating the tagged cuttings with a drill depth in the well at a time during the drilling operation.

8 Claims, 4 Drawing Sheets

(56) References Cited

U.S. PATENT DOCUMENTS

| | | | |
|---|---|---|---|
| 2005/0109087 A1 | 5/2005 | Robb et al. | |
| 2005/0227068 A1 | 10/2005 | Dugan | |
| 2009/0087911 A1 | 4/2009 | Ramos | |
| 2009/0087912 A1 | 4/2009 | Ramos et al. | |
| 2010/0152070 A1* | 6/2010 | Ghassemzadeh | C09K 8/035 507/221 |
| 2013/0017610 A1* | 1/2013 | Roberts | C09K 11/06 436/27 |
| 2013/0284518 A1* | 10/2013 | Wu | C09K 8/035 175/65 |
| 2014/0116778 A1 | 5/2014 | Deville et al. | |
| 2014/0249053 A1* | 9/2014 | Robinson | E21B 47/11 435/6.15 |
| 2018/0171782 A1* | 6/2018 | Cox | E21B 47/11 |
| 2018/0283173 A1 | 10/2018 | Lecolier et al. | |
| 2019/0360326 A1 | 11/2019 | Deville et al. | |

OTHER PUBLICATIONS

Fouz, Munira F., et al., "Bright Fluorescent Nanotags from Bottlebrush Polymers with DNA-Tipped Bristles", ACS central science, pp. A-H, 2015 (8 pages).

Yang, Hongbin, et al., "Synthesis and plugging behavior of fluorescent polymer microspheres as a kind of conformance control agent in reservoirs", RSC Advances, pp. 10478-10488, 2018 (11 pages).

Ellis, Erika S., et al., "Successful Field Test of Real Time Inline Sensing System for Tracer Detection at Well Head", Society of Petroleum Engineers, SPE-188035-MS, 2017 (18 pages).

Yan, Shuaishuai, et al., "SERS-based lateral flow assay combined with machine learning for highly sensitive quantitative analysis of *Escherichia coli* O157:H7", Analytical and Bioanalytical Chemistry, 2020 (10 pages).

International Search Report and Written Opinion Issued in Corresponding Application No. PCT/US2022/052291, dated Apr. 6, 2023, 13 pages.

* cited by examiner

FLUORESCENT ASSEMBLIES FOR DRILLING DEPTH CORRELATION

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" or "formation cuttings" are rock fragments generated by the drill bit as the drill bit advances along the borehole. Mud logging is the creation of a well log of a borehole by examining the rock cuttings brought to the surface by the circulating drilling mud.

A taggant or "tag" is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant include microscopic, metallic tags, e.g., between 0.3 and 1.0 millimeters, that have unique multi-digit alphanumeric identification codes. For example, the identification code may be etched into an optically variable (holographic) substrate of the tag. The tags may be suspended in a UV sensitive clear adhesive which is either brushed or sprayed onto any item for authentication or other security purposes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition of matter comprising a fluorescent assembly and a drilling fluid. The fluorescent assembly comprises a matrix material and a plurality of fluorophores held within the matrix material and has an average particle size of at least one millimeter.

In another aspect, embodiments disclosed herein relate to a method that includes introducing a fluorescent assembly into a drilling fluid, the fluorescent assembly having an average particle size of at least one millimeter. The method then includes circulating the drilling fluid through a well during a drilling operation that creates formation cuttings such that the fluorescent assembly interacts with the formation cuttings, creating tagged cuttings. The method further includes collecting returned cuttings from the circulating drilling fluid at a surface of the well, detecting the presence of the fluorescent assembly on the returned cuttings to identify the tagged cuttings, and correlating the tagged cuttings with a drill depth in the well at a time during the drilling operation.

In yet another aspect, embodiments disclosed herein relate to a method that includes mixing a first fluorophore with a starting monomer and a catalyst to encapsulate the first fluorophore in a polymer matrix material made of the starting monomer. The method then includes extracting fluorescent assemblies having a size of at least 1 mm from the mixture, the fluorescent assemblies comprising the first fluorophore encapsulated in the polymer matrix, and mixing the fluorescent assemblies with a drilling fluid prior to introducing the drilling fluid downhole in a drilling operation.

Other aspects and advantages of the claimed subject matter will be apparent from the following description and the appended claims.

DETAILED DESCRIPTION

Figure 1:
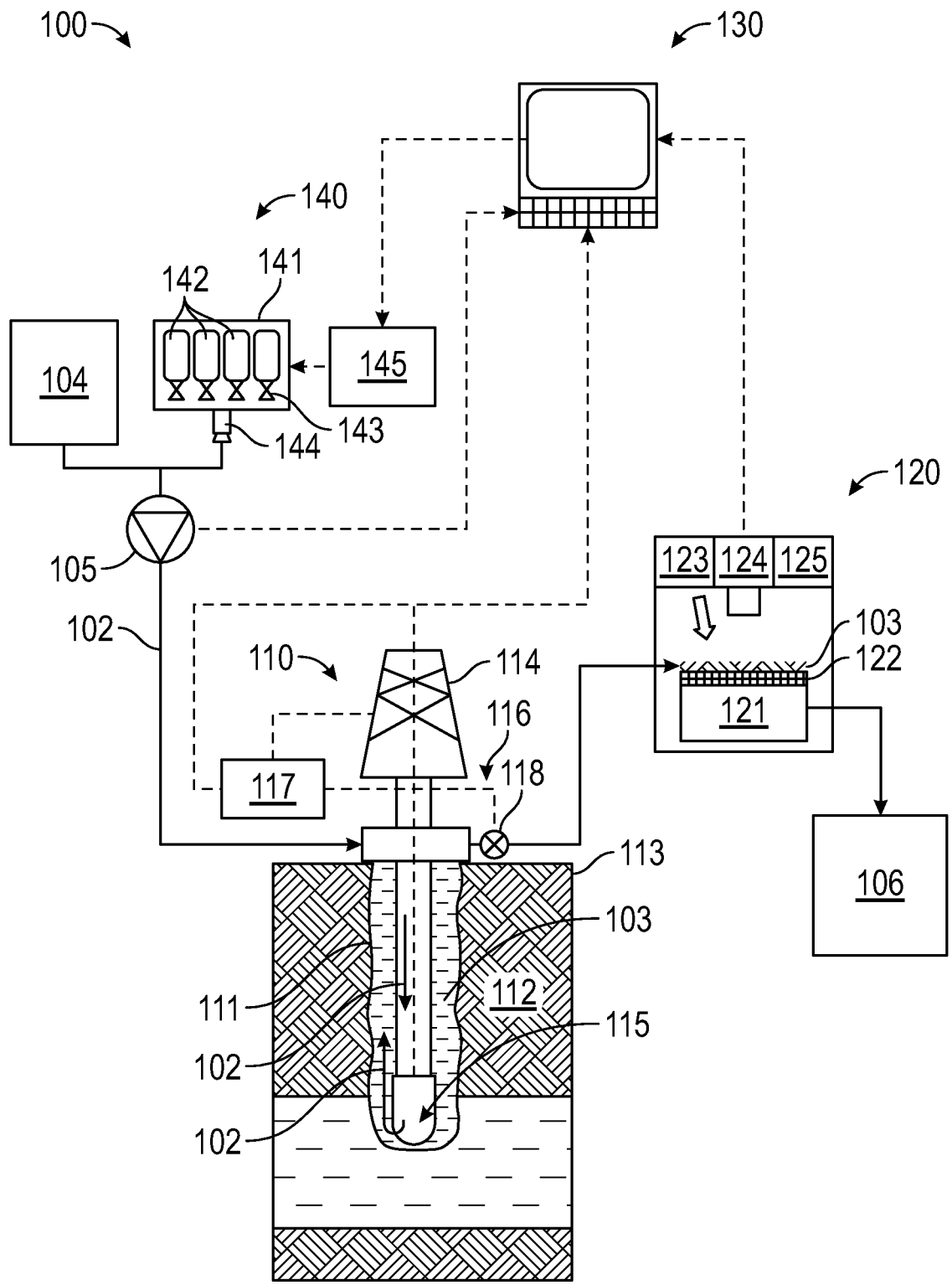
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein generally relate to a composition that includes a fluorescent assembly comprising a matrix material and a plurality of fluorophores held within the matrix material and an aqueous-based drilling fluid. The fluorescent assembly is "macro-scale" meaning it has an average particle diameter of at least one millimeter. Methods of using the composition to determine drill depth of formation cuttings are also described. Fluorescent assemblies in accordance with one or more embodiments may be injected into the drilling fluid during drilling operations and travel downhole. Disclosed fluorescent assemblies may interact with the formation downhole and in some instances, attach to drill cuttings produced during the drilling process. As such, drill cuttings may be "tagged" with the fluorescent assemblies described herein. Fluorescent assembly tags having different wavelengths of fluorescent emissions, i.e., tags emitting different colors, may be controllably introduced at different drill depths. When tagged cuttings are returned to the surface via circulating drilling fluid, they can be identified based upon the fluorescence emission from the tag. This fluorescence may be correlated to an associated drilling depth, and the cuttings may be identified by the depth at which they originated. Thus, disclosed compositions may be useful for determining the drilling depth of various drill cuttings.

Drilling System

FIG. 1 shows a schematic diagram of a system 100 in which the compositions and methods disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return and detection system 120, an analysis and control system 130, and a drilling fluid tagging system 140, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112. As the well 111 is drilled through the formation 112, portions of the well may be cased with a casing (extending from the surface of the well) or a liner (extending downhole from an end of a previously installed casing or liner) to line the wellbore wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of the analysis and control system 130, described below in more detail.

The rig 114 may hold equipment used to drill a borehole to form the well 111. Major components of the rig 114 may include drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at the surface 113, may be referred to as the "up-hole" end of the well 111, and a lower end of the well, terminating in the formation 112, may be referred to as the "downhole" end of the well 111.

In some embodiments, during operation of the well system 110, the well control system 117 may collect and record well data (e.g., from monitoring devices (e.g., logging tools) lowered into the well during monitoring operations (e.g., during in situ logging operations, or from drilling operations) for the well system 110. For example, during drilling operations of the well 111, the well data may include mud properties, flow rates, drill volume and penetration rates, formation characteristics, etc. In some embodiments, the well data may be recorded in real-time, and are available for review or use within seconds, minutes or hours of the condition being sensed (e.g., the measurements are available within 1 hour of the condition being sensed). In such embodiments, the well data may be referred to as "real-time" well data. Real-time well data may enable an operator of the well 111 to assess a relatively current state of the well system 110, and make real-time decisions regarding development of the well system 110 and the reservoir, such as on-demand adjustments in drilling fluid and regulation of production flow from the well.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Drilling fluid directed from the well to the surface may flow through the wellhead, after exiting the well 111 and the well sub-surface system 115, including, for example, casing, production tubing, a drill string, and a bottom hole assembly (including a drill bit). Such fluid may carry the disclosed fluorescent assemblies downhole, as will be explained in greater detail below. In some embodiments, the well surface system 116 may include flow regulating devices that are operable to control the flow of substances into and out of the well 111. For example, the well surface system 116 may include one or more valves 118 that are operable to control the flow of fluid from the well 111. For example, a valve 118 may be fully opened to enable unrestricted flow of returning drilling from the well 111, the valve 118 may be partially opened to partially restrict (or "throttle") the flow of fluid from the well 111, and the valve 118 may be fully closed to fully restrict (or "block") the flow of fluid from the well 111, and through the well surface system 116.

In some embodiments, the well surface system 116 may include surface sensors for sensing characteristics of fluids passing through or otherwise located in the well surface system 116, such as pressure, temperature and flow rate of fluid flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned. In accordance with one or more embodiments of the present disclosure, a fluorescent assembly may be pumped downhole with the drilling fluid 102 and circulated through the well 111 to tag cuttings as they are formed from drilling.

Fluorescent assemblies may be supplied from a tag injection assembly 141 in the tagging system 140. The tag injection assembly 141 may include a plurality of tag chambers 142, each tag chamber 142 holding a different tag and having a valve 143 positioned at a chamber outlet. A metering pump 144 may be in fluid communication with the chamber outlets of the tag chambers 142, such that when tags are released from a tag chamber 142 through the associated valve 143, the tags may be metered into the drilling fluid 102. For example, as drilling fluid 102 is pumped from the drilling fluid source 104 to the well 111, a selected tag may be released from a tag chamber 142 and metered at a selected rate through the metering pump 144 to mix with and flow with the drilling fluid 102 into the well 111.

The valves 143 and metering pump 144 may be operated and controlled using a controller 145. The controller 145 may be integrated with the tag injection assembly 141 or may be remote from the tag injection assembly 141. The controller 145 may send commands to the valves 143 (e.g., to open or close the valve) and the metering pump 144 (e.g., to control the speed at which the tags are metered through the pump). The controller 145 may also receive signals from the valves 143 and metering pump, for example, signals relaying status of operation. The controller 145 may send commands to implement one or more jobs designed by the analysis and control system 130. For example, the analysis and control system 130 may determine an optimized tag release operation and send instructions to the controller 145 for implementing the optimized tag release operation. The controller 145 may then send commands to one or more valves 143 and the metering pump 144 to release tags from one or more tag chambers 142 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled. In one or more embodiments, the drill bit may press the tags into the formation, which may cause the tags to stick to or stain parts of the formation that then become cuttings. In some embodiments, hydraulic circulation may be the main driving force for attachment of the tags to the formation, however, the detailed interaction mechanism between the tags and formation depends on the type of tag used and may vary (e.g., chemical interaction, physical attachment, and/or electrostatic interactions). As the formation is drilled, cuttings 103 from the formation having the attached tags may be sent to the surface of the well and analyzed in the cuttings return and detection system 120.

When the drilling fluid 102 and tagged cuttings 103 are pumped to the surface of the well 111 during a drilling operation, the returned drilling fluid may be directed via one or more conduits (e.g., piping) to one or more separators 121 (sometimes referred to in the industry as shakers) in the cuttings return and detection system 120. In some embodiments, returned cuttings may automatically be directed to one or more separators 121 based on commands received from the well control system 117. A separator 121 may include, for example, one or more screens 122 arranged in the flow path of the returned drilling fluid to catch and separate cuttings 103 from the drilling fluid. For example, a separator 121 may have a screen 122 positioned laterally at an upper end of the separator 121, where returned drilling fluid may be flowed over the screen 122 after returning from the well 111. As the returned drilling fluid 102 is flowed over the screen 122, cuttings 103 in the returned drilling fluid 102 may be caught by the screen 122, while the drilling fluid 102 flows through the screen openings. In such manner, cuttings 103 brought up from drilling the well 111 may be captured and held by a screen 122 in a separator 121. In some embodiments, more than one screen and/or more than one separator may be used to separate cuttings from returned drilling fluid. In some embodiments, one or more conveyors may convey screens and/or cuttings along a path, e.g., to move cuttings to a different location for analysis.

A detection system 120 including one or more UV light sources 123 and a detection apparatus may be used to detect the presence of tags on the drill cuttings. In the embodiment shown in FIG. 1, the detection apparatus is exemplified by a camera 124. In some embodiments, due to the macro-scale size of the tags, the tags may be visibly detected by the human eye. In some embodiments, the UV light source 123 may be provided around the separator 121 in a position to illuminate the cuttings 103 with UV light, and the camera 124 may be positioned above the separator 121 and positioned to take pictures of the cuttings 103 when they are illuminated by the UV light. For example, as shown in FIG. 1, a UV light source 123 and a camera 124 may be held a distance above the top screen 122 of a separator 121 and positioned to face the screen 122. The UV light source 123 and the camera 124 may be positioned adjacent or proximate to each other, such that when the UV light source 123 illuminates cuttings 103 with UV light, the camera 124 may be in a position to take images of the illuminated cuttings 103. In some embodiments, the camera 124, UV light source 123, and separator 121 may be integrated into one equipment unit. In some embodiments, one or more conveyors may be used to convey the captured cuttings 103 a distance from the separator 121 to a separate detection system having at least one UV light source and a camera.

Depending on the return fluid flow rate and amount of cuttings being returned in a drilling operation, separated and captured cuttings may be moved through the separator 121 relatively quickly to allow for a continuous separation operation. To aid in a continuous separation operation, the UV light source 123 may continuously direct UV light towards the collection of cuttings, thereby continuously illuminating the cuttings, and the camera 124 may be controlled to take images of the illuminated cuttings at a rate commensurate with the speed of cutting separation and removal. In some embodiments, the UV light source 123 may be controlled to operate in coordination with the camera 124, such that operation of the UV light source 123 is timed to illuminate the collection of cuttings immediately before and during taking an image of the cuttings with the camera 124, and where the coordinated operation of both the UV light source 123 and camera 124 may be at a rate commensurate with the speed of cutting separation and removal. The camera 124 may be controlled by a timer and/or using a software program to take images at a time when the UV light source is on. For example, a camera 124 may be controlled to take a picture at an interval (e.g., every 5 minutes, every 10 minutes, or at an interval that is tied to a flow rate of returning drilling fluid measured along a flow path between the well 111 and the separator 121), while the UV light source 123 may be controlled to continuously illuminate the separated cuttings or to illuminate the separated cuttings along the same picture taking interval as the camera 124.

In embodiments in which a camera is used as the detection apparatus, an image processing system 125 may be used to analyze images taken by the camera 124 and identify a percentage of tagged cuttings 103 (cuttings that are illuminated an identified color under the UV light) from the total captured cuttings 103 in the image. The image processing system 125 may be provided as part of the detection system 120, for example, where the camera 124 includes software instructions to perform image analysis of the pictures it takes to identify tagged cuttings 103.

The detection data, including an identified amount of at least one tag color, may then be sent to the analysis and control system 130, as discussed in more detail below. In some embodiments, the image processing system 125 may be provided as part of the analysis and control system 130, where a camera 124 may send images of captured cuttings 103 to the image processing system in the analysis and control system to be processed and identify tagged cuttings 103. An image processing system 125 may analyze images in real-time, as each image is taken. For example, in some embodiments, an image processing system 125 may analyze a first image taken by a camera 124 and identify a percentage of cuttings tagged with one or more tag colors before the camera 124 takes a second image.

Any available image processing software may be used to process images taken by the camera 124 and identify an amount of at least one tag color in each image. In some embodiments, image processing software may include instructions to divide an image into discrete uniformly sized units (e.g., pixels) and compare the color in each unit. A ratio may be calculated of the different colored units, which may be used to calculate a percentage of cuttings tagged with a selected tag color (which may be captured in the image while the cuttings are illuminated by the UV light) out of the total amount of cuttings detected in the image. The drilling depth at which the formation cuttings were generated may then be determined based on the colors identified in the collected images.

Fluorescent Assembly Composition

As previously described, the present disclosure relates to a composition useful for determining the drilling depth of cuttings formed during a drilling process. Compositions in accordance with one or more embodiments of the present disclosure include a fluorescent assembly. In one or more embodiments, the fluorescent assembly includes a matrix material and a plurality of fluorophores held within the matrix material.

As previously described, the matrix material is macro-scale. As used herein, "macro-scale" means that the matrix material has a length of at least one millimeter in at least one dimension (e.g., in one dimension, in two perpendicular dimensions, three perpendicular dimensions, or in other multiple dimension). In one or more embodiments, the fluorescent assembly may have a length in at least one dimension of at least 1, 2, 3, 4, 5, 6, 8 or 10 mm (millimeters). Such assemblies may be visible to the unaided eye, meaning microscopy may not be necessary to see the fluorescent assemblies. An additional advantage to the macro-scale dimensions of the assemblies is that they may be separated from the circulating drilling mud using the separator 121 or "shaker". Thus, the fluorescent assemblies may be filtered out of the drilling mud such that circulating mud is not contaminated with the tags.

The matrix material may be provided in a form suitable for passing through the drill bit and attaching to formation cuttings. Particular shapes may encourage the matrix material to attach to or adhere to formation cuttings. For example, in one or more embodiments, the matrix material is in a form selected from the group consisting of a film, a pellet, a fiber, a mesh, a net, a fabric, a bead, a dendrimer, a hook, a filament, a star, a bowl, a shuttlecock, a sheet and combinations thereof.

For example, in some embodiments, the matrix material may be in the form of a hollow fiber. In such embodiments, the hollow fiber may be made of glass, polypropylene, polyethylene, polystyrene, polyvinylidene fluoride, polyvinyl chloride, polytetrafluoroethylene, polyesters, polyethersulfones, cellulose, nitrocellulose, cellulose acetate, polyvinylidene fluoride, cuprammonium rayon, polysulfone, polyamides, polyurethanes, poly(acrylonitrile), polyacrylamide, epoxy, nylon, polyvinyl chloride resins, polyacrylates, polymethacrylates, poly-2-methacryloyloxyethyl phosphorylcholine and combinations thereof. Hollow fibers may be made from polymers as block-copolymers, alternated polymers, cross-linked polymers, star-shaped polymers, branched polymers, dendrimers or composites of interwoven polymeric fibers.

In embodiments in which the matrix material is in the form in a mesh or a net, the net and/or mesh may be made from polymeric fibers, polyethylene, polypropylene, polystyrene, polyacrylonitrile, polyacrylates, polyethylene glycol, polyethylene glycol diacrylate, and other polymers, nylon, peptide fibrils (such as collagen), gelatin, textile-based fibrils, plant fibers (such as cotton fibers, date seeds fibers, cellulose fibers, nitrocellulose, starch, and palm tree fibers), and fabrics such as woven threads of polymeric fibers, hollow fibers, fiberglass materials, carbon fibers and others, and combinations thereof.

In one or more embodiments, the matrix material may be a gel or a hydrogel. As used herein, a gel is a 3-dimensional colloidal polymeric network. As used herein, a hydrogel is a hydrophilic polymeric network in a continuous aqueous phase. Gels and hydrogels may be particularly useful as tags because they may swell when they come into contact with the drilling fluid. Upon swelling, the increase in size may allow the tags to be more readily identifiable, and the tags also may become tackier, allowing them to adhere better to formation cuttings. In one or more embodiments, the gel or hydrogel may be made from polyethylene glycols, poloxamers, rubbers, colloids, peptides, proteins (for example, globular or fibrillar protein gels, collagen, gelatin), polyacrylates, polysaccharides and/or polysaccharides-proteins mixtures, agarose, pectin, sodium dextran sulfate, carrageenan, alginates, poly(N, N'-methylenebisacrylamide), guar gum, gellan gum, xanthan gum, xyloglucans, hydroxypropylmethyl cellulose, chitosan, hydroxypropyl cellulose, gum Arabic, modified starch, modified cellulose, polyacrylic acid, sodium salt of polyacrylic acid, polyacrylamide, soy protein/poly(acrylic acid), poly-N,N-dimethylacrylamide, polyacrylamide, ethylene maleic anhydride, cross-linked carboxymethylcellulose, polyvinyl alcohol copolymers, cross-linked polyethylene oxide, starch grafted copolymer of polyacrylonitrile.

In one or more embodiments, the fluorescent assembly may be a gel comprising a material selected from the group consisting of polyethylene glycols, poloxamers, rubbers, colloids, peptides, globular protein gels, fibrillar protein gels, collagen, gelatin, polyacrylates, polysaccharides, agarose, pectin, sodium dextran sulfate, carrageenan, alginates, poly(N, N'-methylenebisacrylamide), guar gum, gellan gum, xanthan gum, xyloglucans, hydroxypropylmethyl cellulose, chitosan, hydroxypropyl cellulose, gum Arabic, modified starch, modified cellulose, polyacrylic acid, sodium salt of polyacrylic acid, polyacrylamide, soy protein, poly(acrylic acid), poly-N,N-dimethylacrylamide, polyacrylamide, ethylene maleic anhydride, cross-linked carboxymethylcellulose, polyvinyl alcohol copolymers, cross-linked polyethylene oxide, starch grafted copolymer of polyacrylonitrile and combinations thereof.

The degree of the cross-linking of the previously described gel, mesh, or fiber may be tuned by varying the molar ratio between a cross-linking agent and monomer(s). Synthesis methods for cross-linking may include, for example, radical reactions, using radiation sources such as ultraviolet (UV), and condensation reactions. The higher the degree of cross-linking, the higher the density of the polymer. A higher degree of cross-linking, and thus a higher density, may be achieved by using a higher ratio of cross-linking agent to monomer. For example, in one or more embodiments, for polyacrylic-based hydrogels, changing a molar percent of a cross-linking agent to a monomer from $5.45 \times 10^{-2}$ to 4.58 results in about twice the degree of swelling for the sample with less cross-linking agent. Thus, by appropriately selecting a ratio of cross-linking agent to monomer content, the density of the gel, mesh, or fiber may be tuned to have a suitable density and swelling for use in drilling fluid.

Additionally, gel and hydrogel matrices may have higher mechanical and rheological properties compared to matrices that are not cross-linked. Hydrogels swelling in contact with a wet formation surface may cause the polymer hydrogel tag to stick to the wet formation surface. Additionally, when using hydrogel fluorescent tags that swell upon exposure to water during drilling fluid and drill cuttings flow, the tags may be injected into the drilling fluid as nano-sized tags that have a neutral effect on the drilling fluid rheology, which may then swell into visible macro-sized tag assemblies after exposure to water during the drilling cycle.

The matrix material may have as suitable surface functionality for attachment to drill cuttings. For example, in carbonate formations, the surfaces of drill cuttings may be positively charged. Therefore, the matrix material may be selected to have a negative surface functionality. The matrix material may also be modified to include a negative surface functionality. For example, if formation cuttings exhibit positive surface charge, the matrix material of a tag may be functionalized with addition of anion surfactants, such as sulfates, sulfonates and gluconates, or an additive such as xanthan gum to exhibit negative charge on the surface to allow a better interaction between the formation cuttings and tags.

In accordance with one or more embodiments, the fluorescent assemblies include a plurality of fluorophores held within the matrix material. Fluorescence refers to a form of luminescence that may emit light when ultraviolet light or other electromagnetic radiation is absorbed. For example, when ultraviolet light is absorbed by a fluorescent compound (also referred to as a fluorophore), the fluorescent compound may emit visible light, which may be referred to as fluorescent light. Thus, as used herein, a fluorophore is a compound that emits visible light when it absorbs electromagnetic radiation. Suitable fluorophores are those that emit fluorescence at a known wavelength on the spectrum of visible light (i.e., from about 400 to about 700 nanometers) and are stable under formation conditions. As may be appreciated by those skilled in the art, fluorophores having different wavelengths of emission may be chosen to distinguish different fluorophores.

In one or more embodiments, the fluorophores are fluorescent dyes, quantum dots, fluorescent microspheres, fluorescent polymers, fluorescent metal-organic frameworks, fluorescent covalent-organic frameworks, lanthanide compounds, rare earth elements and combinations thereof. Examples of fluorophores may include but are not limited to polymers that are covalently modified with a fluorescent dye moiety, polymers having fluorescent dyes intercalated inside the crosslinked polymer structure, fluorescent polymeric microspheres (such as FluoSpheres® and TransFluoSpheres®, for example), fluorescent glass microspheres, fluorescent glass beads, fluorescent ceramic particles, particles of fluorescent minerals, fluorescent proteins (such as green fluorescent protein, for example), fluorescent quantum dots, rare earth metal derivatives and lanthanide compounds, fluorescent metal-organic frameworks, and fluorescent porous organic polymers. Examples of fluorescent dyes include, but are not limited to, fluorescein and Rhodamine B, among others.

In one or more embodiments, the fluorophore may be included in a nanoparticle. Examples of nanoparticles that can include a fluorophore may be porous silica, zeolites, aluminum oxide, titanium oxide, synthetic porous cages, porous organic polymers, metal-organic frameworks, porous sorbents, and cross-linked polymeric nanoparticles such as polystyrene nanoparticles. A synthetic porous cage is an organic material with tunable porosity. The porous organic cage has a molecular "cage" that may selectively adsorb certain materials, such as fluorophores. A porous sorbent is a natural or synthetic material with an affinity to absorb or adsorb other molecules such as fluorophores.

As previously described, a plurality of fluorophores may be held within the matrix material. As such, fluorophores may be encapsulated by the matrix material such that fluorescence emission is still visible when exposed to UV radiation. By encapsulating the fluorophores and trapping the fluorophores in the matrix material, the fluorophores may not leech into the drilling mud and continue to circulate. However, in some embodiments, the fluorophore may be bonded to the surface of the matrix material. In such embodiments, the bond may be sufficiently strong to avoid significant leeching of the fluorophores into the drilling fluid.

Figure 4A:
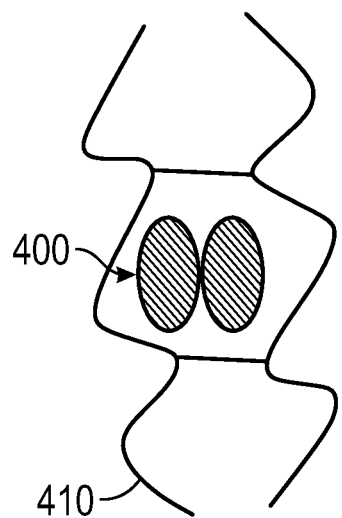
FIGS. 4A and 4B show a comparison between fluorescent encapsulated assemblies and fluorescent surface bonded assemblies according to embodiments of the present disclosure.
Figure 4B:
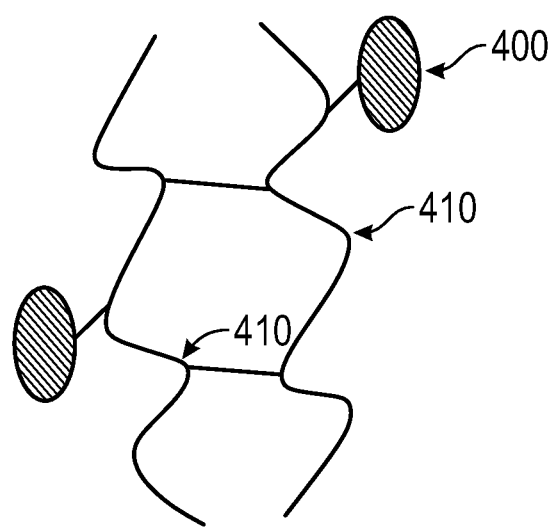

In some embodiments, rather than encapsulating fluorophores in a matrix material, a matrix material may have its surface modified to bond to fluorophores. As an example, a fabric matrix material may be stained with a fluorescent dye, where the stained fabric may be provided in pieces having a size ranging, for example, between 1 and 10 mm. FIGS. 4A and 4B show simplified diagrams of assemblies according to embodiments of the present disclosure comparing assemblies of fluorophores encapsulated in a matrix material and fluorophores bonded to the surface of a matrix material. FIG. 4A shows an example assembly having fluorophores 400 encapsulated within a polymer matrix material 410, and FIG. 4B shows an example assembly having fluorophores 400 bonded to the surface of the polymer matrix material 410.

Fluorescent assemblies in accordance with one or more embodiments may further include magnetic particles. Examples of suitable magnetic particles include but are not limited to Co, Mn, Ni and Fe clusters. Oxides and alloys of Co, Mn, Ni and Fe may also be used. Magnetic particles may be encapsulated in the matrix material, similar to the fluorescent material. Magnetic particles may allow for the fluorescent assemblies to be separated from drill cuttings using a magnetic field. This provides a method for optionally recycling and reusing the fluorescent assemblies.

Methods of Making Fluorescent Assemblies

The present disclosure also relates to methods of making the disclosed fluorescent assemblies. As previously described, the fluorescent assemblies may include a plurality of fluorophores held within a matrix material. Methods of encapsulating fluorophores in a matrix material may vary depending on the type of matrix material and its structure.

For example, assemblies having fluorophores encapsulated in a polymer matrix material may be formed by providing the fluorophores in a polymer mixture during polymerization of the polymer matrix material, while assemblies having fluorophores encapsulated in a fiber matrix material may be formed by extruding the fibers with fluorophores. Various examples of methods for forming assemblies according to embodiments of the present disclosure are provided below.

As described previously, in one or more embodiments, a fluorescent assembly may be made of polystyrene fibers having fluorescein and Rhodamine B intercalated in the polystyrene fibers. In such embodiments, the fluorescent assembly may be made by polymerizing and crosslinking styrene monomers in the presence of fluorescein and/or Rhodamine B. The resultant assembly includes fluorescein and Rhodamine B encapsulated in the polystyrene polymer structure.

Figure 2A:
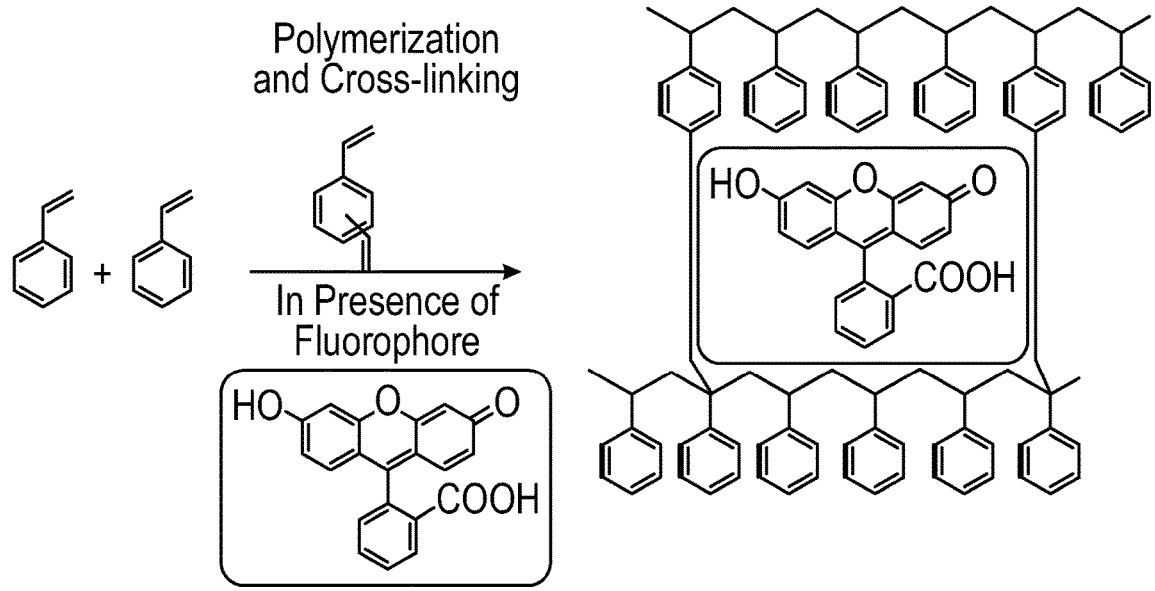
FIG. 2A shows a reaction scheme in accordance with one or more embodiments.
Figure 2B:
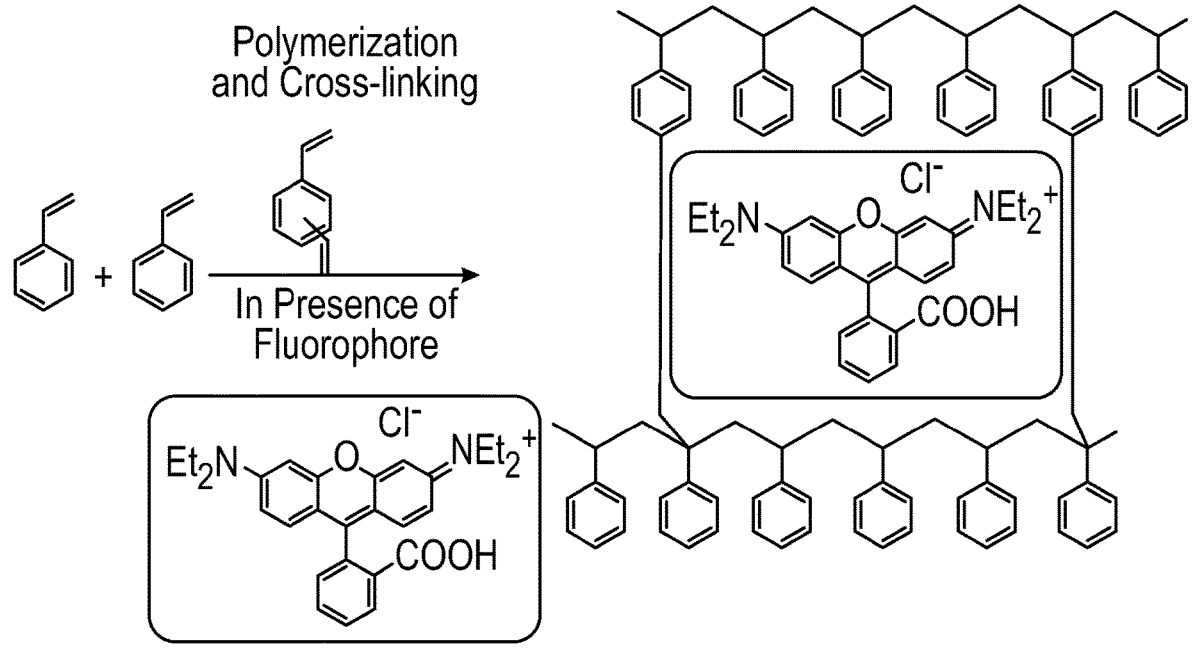
FIG. 2B shows a reaction scheme in accordance with one or more embodiments.

A schematic depiction of a method of making polystyrene fibers having fluorescein or Rhodamine B intercalated in the polystyrene fibers is shown in FIGS. 2A and 2B. FIG. 2A shows a schematic depiction of a method of making polystyrene fibers having fluorescein intercalated in the fibers. In the embodiment shown in FIG. 2A, styrene is polymerized in the presence of fluorescein and a catalyst, where cross-linking around the fluorescein encapsulates the fluorescein within the styrene. FIG. 2B shows a schematic depiction of a method of making polystyrene fibers having Rhodamine B intercalated in the fibers. In the embodiment shown in FIG. 2B, styrene is polymerized in the presence of Rhodamine B and a catalyst, where cross-linking around Rhodamine B may encapsulate the Rhodamine B within the styrene. The catalyst may be chosen based upon the monomer(s) being polymerized and the desired final polymer structure. In one or more embodiments, the catalyst may be AIBN (azobisisobutyronitrile), ammonium persulfate, butyllithium, or a Ziegler-Natta catalyst. Additionally, other starting materials, such as copolymers, magnetic particles, and other additives, may be provided with a starter monomer, fluorophores, and a catalyst or initiator. For example, various ratios of starting materials such as styrene, divinyl benzene, and fluorescein may be provided with a catalyst to form a polymer matrix material encapsulating the fluorescein.

In some embodiments, fluorophore assemblies may be formed by extrusion. For example, fluorescent polymer fibers may be formed by extruding a polymer (e.g., either thermoplastic or thermoset polymers) in the presence of a fluorophore to form a fluorescent polymer fiber. In one or more embodiments, multiple polymers may be coextruded to form a fiber having two different types of polymers. For example, when coextruding fluorophore embedded fibers, separate extruders may be used for each distinct material in the coextrusion (where fluorophores may be added to one or more of the distinct material streams). As the separate material streams are extruded, and while the materials are still melted or malleable, the material streams may be brought together to form fluorophore embedded fiber assemblies.

In one or more embodiments, wet spinning may be used to make a fluorescent assembly. Wet spinning is a form of solution spinning where polymer powder is dissolved in a suitable solvent and the polymer solution is extruded through a spinneret into a solvent-non solvent mixture which serves as a coagulant. Due to mutual diffusion of solvent and non-solvent, the polymer solution coagulates to form filaments or fibers. In order to form a fluorescent assembly, a powder polymer may be dissolved in a solvent that contains a solution of the fluorophore. Then the extrusion may proceed to form a fluorescent assembly in the form of a fiber.

In one or more embodiments, melt spinning may be used to make a fluorescent assembly in the form of a fiber. In particular, a molten fluorescent polymer may be extruded through a spinneret composed of capillaries. As the molten fluorescent polymer exits the spinneret, the resulting fluorescent filament may be solidified by cooling.

In one or more embodiments, dry-jet spinning may be used to make a fluorescent assembly. Dry-jet spinning is a process in which dissolved polymer is fed out of a spinneret on an air gap to drive off the solvent and then goes into a coagulation bath to be solidified. In accordance with one or more embodiments, a starting polymer may be dissolved in a solution containing a fluorophore, which may be dry-jet spun to provide a fluorescent assembly according to embodiments of the present disclosure.

In one or more embodiments, the disclosed fluorescent assemblies may be made via 3D printing techniques. In such embodiments, a thermoplastic polymer, such as acrylonitrile-butadiene-styrene (ABS) that is compatible (miscible) for printing with additives such as carbon fibers, carbon quantum dots, or fluorescent dyes may be used. Thus, in one or more embodiments of the present disclosure, a blend of a thermoplastic polymer with fluorescent dyes (for example, fluorescein or Rhodamine B) may be used for 3D printing. Another embodiment of the present disclosure includes fluorescent labelling of the styrene part of the ABS thermoplastic polymer. In yet another embodiment, high impact polystyrene (HIPS) may be fluorescently labeled. Other examples of suitable thermoplastics for 3D printing in accordance with the present disclosure include polyethylene terephthalate (PET), polyvinyl alcohol (PVA), nylon, and polylactic acid (PLA).

In embodiments in which a gel or hydrogel is used as the matrix material, a fluorescent polymer gel can be obtained via incorporation of fluorescent materials either into the gel skeleton, or as adorned fluorescent moieties. Adorned fluorescent polymer gels include ways of assembly of different luminescent entities (such as fluorescent dye molecules, quantum dots, carbon dots, lanthanide transition metals, and others) onto hydrogel networks by orthogonal metal coordination and host-guest interaction, incorporation of fluorophores into polymer matrices by infusion, self-assembly, and co-assembly of gel hybrid system via bio-conjugation or co-assembly of peptide motifs and transition metal ions.

Composition of a Drilling Fluid Including Fluorescent Assemblies

The fluorescent assemblies in accordance with the present disclosure may be added to a drilling fluid to provide a drilling fluid composition. The disclosed assemblies may be suitable for use in any type of drilling fluid. In one or more embodiments, the drilling fluid may include a suitable amount of the fluorescent assemblies for delivering the tags downhole to the formation. The amount of fluorescent assemblies may be adjusted depending on the type of fluorescent assembly used. In one or more embodiments, the drilling fluid may include at least 1 wt. % of the fluorescent assembly relative to the total weight of the drill cuttings.

Method of Correlating Recovered Drill Cuttings to Drilling Depth

Figure 3:
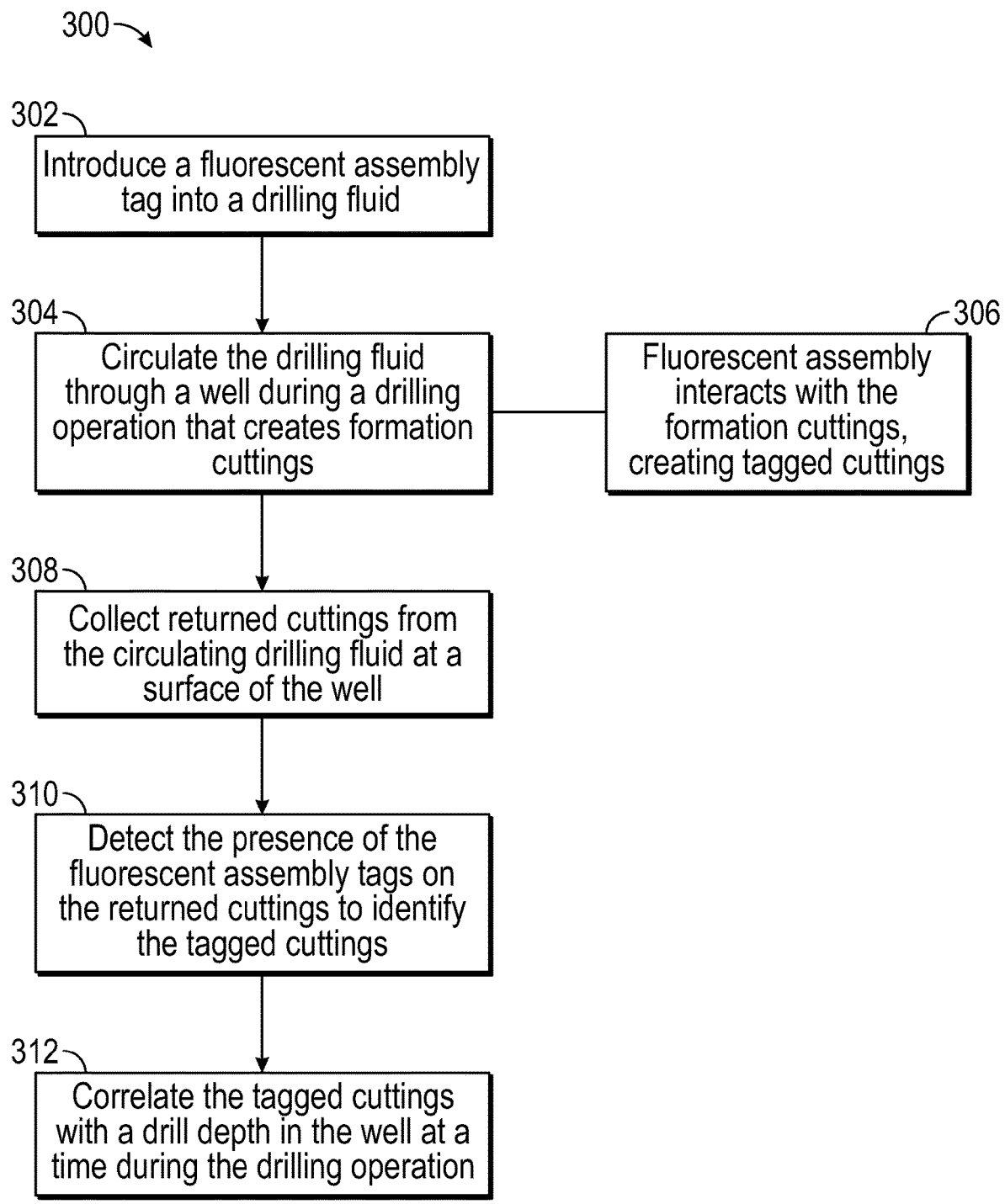
FIG. 3 shows a block flow diagram of a method in accordance with one or more embodiments of the present disclosure.

One or more embodiments of the present disclosure relate to methods of using the disclosed fluorescent assemblies to determine the drill depth of drill cuttings. An exemplary method 300 is shown in FIG. 3. The method 300 shown in FIG. 3 includes introducing a fluorescent assembly (tag) into a drilling fluid, the fluorescent assembly having a matrix material and a plurality of fluorophores held within the matrix material 302. The fluorescent assembly tags may be introduced into the drilling fluid by mixing the tags with the drilling fluid prior to pumping the drilling fluid downhole (e.g., via the tagging system 140 described with reference to FIG. 1). A tag having a particular fluorescence emission wavelength may be introduced at a known drill depth.

After the tag has been introduced into the drilling fluid, the drilling fluid is circulated through a well during a drilling operation that creates formation cuttings 304. During the process of circulating the drilling fluid as formation cuttings are created, the fluorescent polymer interacts with the formation cuttings, creating tagged cuttings 306.

As drilling fluid is circulated in the well, cuttings, including tagged cuttings, are returned to the surface of the well in the circulating fluid. The method 300 includes collecting these returned cuttings from the circulating drilling fluid at a surface of the well 308. In some embodiments, the returned cuttings may be collected via the cuttings return and detection system 120 described with reference to FIG. 1.

Once returned drill cuttings are collected, the presence of the fluorescent assembly tags may be detected on the returned cuttings to identify the tagged cuttings 310. The presence of the fluorescent assembly tags may be detected by illuminating the returned cuttings with UV light and obtaining images of the cuttings with a camera. Other methods for detecting the fluorescent assemblies on the drill cuttings may be used. For example, fluorimetry, ultraviolet spectroscopy, spectrophotometry, gel permeation chromatography with light scattering detector, and X-ray fluorescence analysis (XRF) may all be suitable detection methods. Furthermore, methods of detection that are not based on the light-emission property of the assemblies may be used, such as gas chromatography-mass spectrometry, liquid chromatography-mass spectrometry, nuclear magnetic resonance, and gel permeation chromatography, to detect and quantify returned tags.

The method 300 then includes correlating the tagged cuttings identified from the returned cuttings with a drill depth in the well at a time during the drilling operation 312. The correlation may be made by identifying the fluorescence of the tagged cuttings and associating the fluorescent with a tag that was introduced at a given time. The time at which a particular tag was introduced may be associated with a given drill depth (e.g., based on drill pipe length, pump rate, and calculated return time).

In one or more embodiments, multiple tags may be used to determine depth of cuttings at different times during the drilling operation. In such embodiments, after the previously described steps, a second fluorescent assembly tag may be pumped with the drilling fluid down the well. The second fluorescent assembly tags may attach to and tag formation cuttings as the well is drilled. During the drilling operation, the drill cuttings are returned to the surface of the well as the drilling fluid is circulated, and the presence of the second fluorescent assembly may be detected on the tagged cuttings in the same or similar manner that previous fluorescent assembly tags were detected.

In one or more embodiments, the first fluorescent assembly tags may have a first emission wavelength, and the second fluorescent assembly tags may have a second emission wavelength. The first emission wavelength is different from the second emission wavelength such that the first fluorescent assembly may be differentiated from the second fluorescent assembly by illuminating the fluorescent assemblies with UV light and obtaining images of the cuttings with a camera. As will be appreciated by those skilled in the art, any number of different fluorescent assemblies may be used at different depths during the drilling process. The fluorescent assemblies may be chosen based on their emission wavelength such that they may be differentiated from one another using any of the aforementioned detection methods.

As previously described, in one or more embodiments, the fluorescent assemblies may include magnetic particles. In such embodiments, disclosed methods may further include separating the fluorescent assembly from the formation cuttings using a magnetic field. The magnetically collected fluorescent assemblies may be collected and recycled for reuse. Additionally, non-magnetic samples may also be recycled and reused. In such instances, it is generally sufficient to rinse the cuttings with a small amount of organic solvent, which will remove the tags from the cuttings. The removed tags can then be collected and recycled for reuse.

Embodiments of the present disclosure may provide at least one of the following advantages. The disclosed compositions and methods may allow for more precise depth determination of drill cuttings in real time during drilling operations as compared to conventional methods of analyzing drill cuttings. In one or more embodiments, analysis may be performed rapidly on-site, rather than transporting samples to a laboratory for analysis. The disclosed compositions and methods may also provide the advantage of not requiring microscopy techniques to detect the tags due to their macro-scale dimensions. Furthermore, in some embodiments, the tags may be recycled using magnetic recovery of assemblies that include magnetic particles.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition of matter comprising:
    a fluorescent assembly comprising a matrix material and a plurality of fluorophores held within the matrix material; and
    drilling fluid;
    wherein the matrix material is a mesh; and
    wherein the fluorescent assembly has a length in at least one dimension of between 2 and 10 millimeters.

2. The composition of claim 1, wherein the plurality of fluorophores are selected from the group consisting of fluorescent dyes, quantum dots, fluorescent microspheres, fluorescent polymers, fluorescent metal-organic frameworks, fluorescent covalent-organic frameworks, lanthanide compounds, rare earth elements and combinations thereof.

3. The composition of claim 1, wherein the mesh is comprised of a material selected from the group consisting of polyethylene, polypropylene, polystyrene, polyacrylonitrile, polyacrylates, polyethylene glycol, polyethylene glycol diacrylate, nylon, collagen, gelatin, textile-based fibrils, cotton fibers, date seed fibers, cellulose fibers, nitrocellulose, starch, palm tree fibers, fiberglass, carbon fibers and combinations thereof.

4. The composition of claim 1, wherein the fluorescent assembly further comprises a magnetic particle selected from the group consisting of oxides and alloys of Co, Mn, Ni and Fe.

5. The composition of claim 1 further comprising formation cuttings, wherein the fluorescent assembly is attached to the formation cuttings.

6. A composition of matter comprising:
a fluorescent assembly comprising:
- a matrix material;
- a plurality of fluorophores held within the matrix material;
- a first length in a first dimension of between 2 and 10 millimeters; and
- a second length in a second dimension, perpendicular to the first dimension, of between 2 and 10 millimeters; and drilling fluid.

7. The composition of claim 6, wherein the fluorescent assembly further comprises a third length in a third dimension of between 2 and 10 millimeters, wherein the third dimension is perpendicular to the first dimension and the second dimension.

8. The composition of claim 6, wherein the matrix material is in a form selected from the group consisting of a film, a pellet, a mesh, a fabric, a bead and combinations thereof.

* * * * *